United States Patent
Ayotte et al.

(10) Patent No.: US 9,645,573 B2
(45) Date of Patent: May 9, 2017

(54) RELIABILITY MONITOR TEST STRATEGY DEFINITION

(71) Applicant: International Business Machines Corporation, Armonk, NY (US)

(72) Inventors: Stephen P. Ayotte, Bristol, VT (US); Petra U. Klinger-Park, Jericho, VT (US); Mark T. W. Lam, Singapore (SG); Sanda S. Myat, Singapore (SG); Glen E. Richard, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 14/553,403

(22) Filed: Nov. 25, 2014

(65) Prior Publication Data

US 2016/0147220 A1  May 26, 2016

(51) Int. Cl.
*G01R 31/00* (2006.01)
*G05B 19/418* (2006.01)

(52) U.S. Cl.
CPC .......... *G05B 19/41875* (2013.01); *G05B 2219/45032* (2013.01); *Y02P 90/22* (2015.11)

(58) Field of Classification Search
CPC .............. G01R 1/0466; G01R 1/07314; G01R 31/2879; G01R 31/2886; G01R 31/2889; G01R 31/2896
See application file for complete search history.

(56) References Cited

U.S. PATENT DOCUMENTS

| 7,747,572 | B2 | 6/2010 | Scott et al. | |
| 2004/0040001 | A1* | 2/2004 | Miller | H01L 22/20 438/10 |
| 2009/0276174 | A1* | 11/2009 | Good | G05B 19/41875 702/81 |
| 2011/0010215 | A1* | 1/2011 | Lin | G06Q 10/06 705/7.31 |
| 2013/0104105 | A1 | 4/2013 | Brown et al. | |

FOREIGN PATENT DOCUMENTS

| EP | 2378502 A2 | 10/2011 |
| EP | 2492854 A1 | 8/2012 |
| WO | 0002136 A1 | 1/2000 |

OTHER PUBLICATIONS

Vangara, "Managed Test Services", © Maveric Systems Limited, <www.slideshare.net/mavericsystemsltd/managed-test-services>.

* cited by examiner

*Primary Examiner* — Tung X Nguyen
(74) *Attorney, Agent, or Firm* — Maeve Carpenter (57) ABSTRACT

In an approach to determining reliability test strategy, one or more computer processors receive a volume forecast for manufacturing one or more products. The one or more computer processors receive information describing the one or more products. The one or more computer processors retrieve reliability test requirements associated with the one or more products. The one or more computer processors retrieve reliability test capability of one or more reliability test vendors. The one or more computer processors determine, based, at least in part, on the volume forecast, the information describing the one or more products, the reliability test requirements, and the reliability test capability of the one or more reliability test vendors, a reliability test strategy.

20 Claims, 4 Drawing Sheets

RELIABILITY MONITOR TEST STRATEGY DEFINITION

BACKGROUND OF THE INVENTION

The present invention relates generally to the field of semiconductor devices, and more particularly to determining a reliability monitor test strategy for semiconductor packaging.

Integrated circuits on semiconductor devices are found in a wide variety of equipment, including household appliances, consumer electronics, communications systems, automotive systems, aircraft, and the like. As dependence on integrated circuits has increased, the reliability of the devices, and the reliability of the interconnection of a device to the substrate on which the device is packaged, has increasingly become an important concern. In general, as devices scale to smaller dimensions and more advanced silicon fabrication technologies, the devices often become less reliable for the same use conditions. Reliability is a design engineering discipline that applies scientific knowledge to assure a product will perform its intended function for the required duration within a given environment. This includes designing in the ability to maintain, test, and support the product throughout its total life cycle.

A semiconductor device interconnected to a substrate is often referred to as a semiconductor package or a module. Ongoing reliability monitoring of semiconductor packages can be recommended or required by industry standards and users. One industry standard that defines ongoing reliability monitoring is the JEDEC Solid State Technology Association (JEDEC). JEDEC is an independent semiconductor engineering trade organization and standardization body. JEDEC specifies a plurality of tests and criteria for evaluating semiconductor package reliability. Tests include deep thermal cycling (DTC), high temperature storage (HTS), highly accelerated stress test (HAST), and pressure cooker test (PCT). In addition, JEDEC specifies the monitoring of moisture sensitivity levels.

SUMMARY

Embodiments of the present invention disclose a method, a computer program product, and a system for determining reliability test strategy. The method may include one or more computer processors receiving a volume forecast for manufacturing one or more products. The one or more computer processors receive information describing the one or more products. The one or more computer processors retrieve reliability test requirements associated with the one or more products. The one or more computer processors retrieve reliability test capability of one or more reliability test vendors. The one or more computer processors determine, based, at least in part, on the volume forecast, the information describing the one or more products, the reliability test requirements, and the reliability test capability of the one or more reliability test vendors, a reliability test strategy.

DETAILED DESCRIPTION

For an enterprise that produces a variety of semiconductor packages, a reliability monitoring test strategy includes a combination of products and tests that meets customer and industry standard requirements while minimizing the number of tests and samples. Inaccurate, ineffective communication of the reliability monitoring strategy to vendors that execute the testing may cause performance of unwanted or incorrect tests and a waste of time and samples.

Embodiments of the present invention recognize that efficiencies can be gained by implementing a systematic method of devising a reliability test strategy and effectively communicating the strategy. Implementation of embodiments of the invention may take a variety of forms, and exemplary implementation details are discussed subsequently with reference to the Figures.

Figure 1:
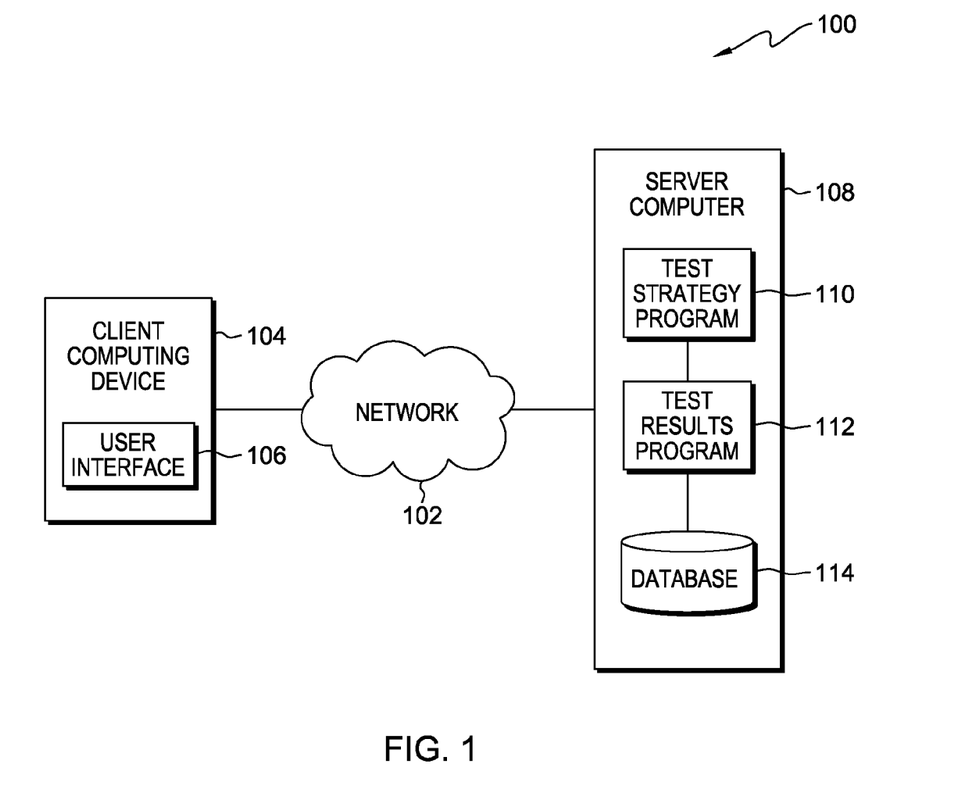
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Client computing device 104 can be a desktop computer, a laptop computer, a tablet computer, a specialized computer server, a smart phone, or any programmable electronic device capable of communicating with server computer 108 via network 102 and with various components and devices within distributed data processing environment 100. In general, client computing device 104 represents any programmable electronic device or combination of programmable electronic devices capable of executing machine readable program instructions and communicating with other computing devices via a network, such as network 102. Client computing device 104 includes user interface 106.

User interface 106 provides an interface between a user of client computing device 104 and server computer 108. User interface 106 may be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. User interface 106 may also be mobile application software that provides an interface between a user of client computing device 104 and server computer 108. Mobile application software, or an "app", is a computer program designed to run on smart phones, tablet computers and other mobile devices. User interface 106 enables a user of client computing device 104 to review test strategies and results on server computer 108.

Server computer 108 can be a management server, a web server, or any other electronic device or computing system capable of receiving and sending data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 via network 102. In another embodiment, server computer 108 represents a computing system utilizing clustered computers and components to act as a single pool of seamless resources. Server computer 108 includes test strategy program 110, test results program 112, and database 114.

Test strategy program 110 combines a plurality of inputs to determine a test strategy for ongoing reliability monitoring of semiconductor packages. The plurality of inputs includes, but is not limited to, forecast volume of packages scheduled to be manufactured, package form factors and metallurgy, customer requirements, industry requirements, stress tests and conditions, and test vendor capability. Test strategy program 110 determines a combination of products and tests that provides a reliability monitor of a wide range of packages and requirements, even if not all types of packages are subjected to testing. Test strategy program 110 is depicted and described in further detail with respect to FIG. 2.

Test results program 112 captures the results of ongoing reliability monitoring. Test results program 112 determines whether any test failures are detected, and, if failures are detected, test results program 112 notifies a failure analysis laboratory that analysis is needed. Test results program 112 also generates output and stores test results for engineering review. Test results program 112 is depicted and described in further detail with respect to FIG. 3.

Database 114 resides on server computer 108. In another embodiment, database 114 can reside elsewhere in the environment. A database is an organized collection of data. Database 114 can be implemented with any type of storage device capable of storing data that can be accessed and utilized by server computer 108, such as a database server, a hard disk drive, or a flash memory. In other embodiments, database 114 can represent multiple storage devices within server computer 108. Database 114 stores data required by test strategy program 110. For example, database 114 stores the volume forecast for manufacturing of all products for which reliability monitoring is specified. Database 114 also stores product description information, which includes, but is not limited to, product name, part number, customer, form factor, and metallurgy. In addition, database 114 stores reliability test specifications, test requirements, and pass/fail criteria. Database 114 may also store information regarding test vendors and labs and vendor test capabilities. Database 114 stores customer requirements, including any exemptions or exceptions a customer specifies. Database 114 also stores test results generated by test results program 112.

Figure 2:
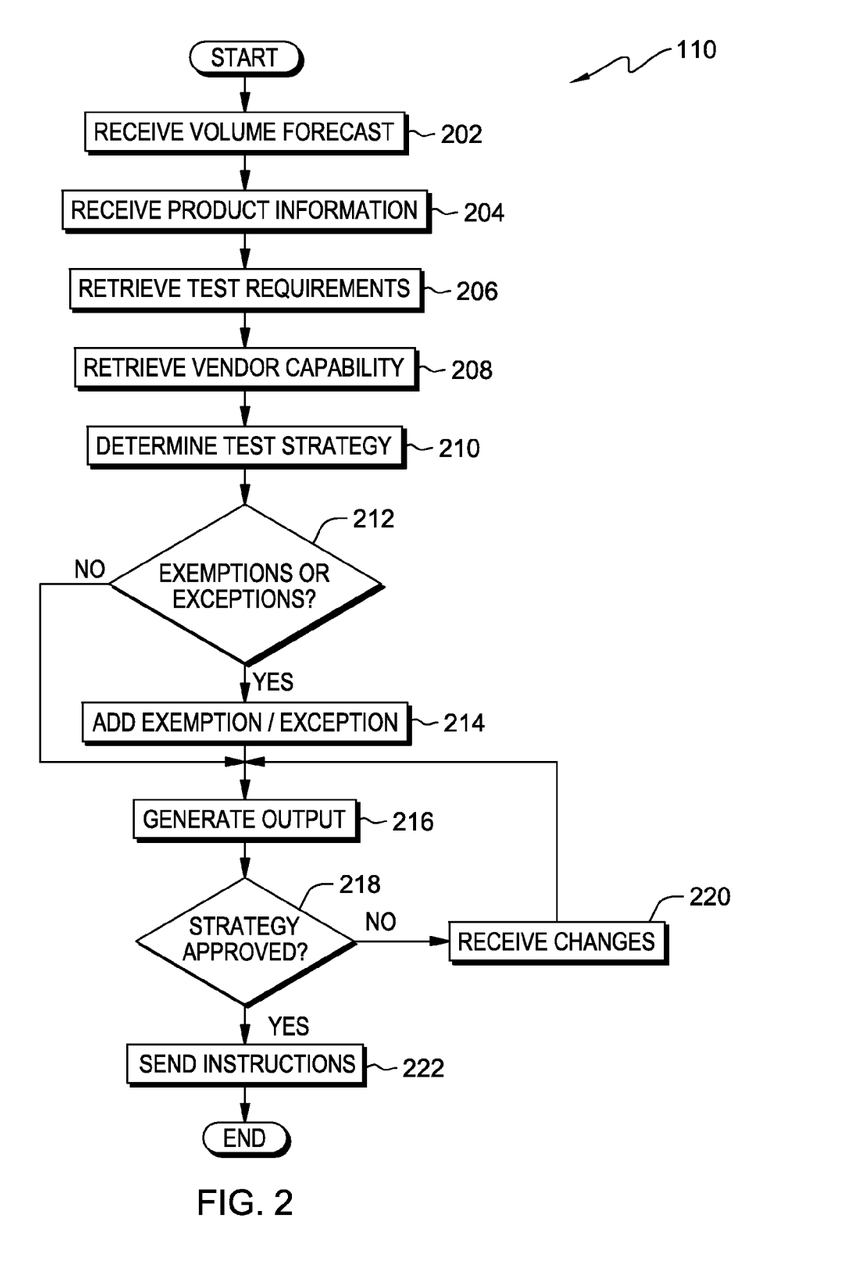
FIG. 2 is a flowchart depicting operational steps of a test strategy program, on a server computer within the distributed data processing environment of FIG. 1, for determining a reliability monitor plan, in accordance with an embodiment of the present invention.

FIG. 2 is a flowchart depicting operational steps of test strategy program 110, on server computer 108 within distributed data processing environment 100 of FIG. 1, for determining a reliability monitor plan, in accordance with an embodiment of the present invention.

Test strategy program 110 receives volume forecast (step 202). Test strategy program 110 receives the volume forecast data for all semiconductor packages that are planned to be manufactured in a future time interval, such as a quarter. In one embodiment, test strategy program 110 receives the volume forecast from a user of client computing device 104 via user interface 106. In another embodiment, test strategy program 110 may retrieve the volume forecast data from database 114.

Test strategy program 110 receives product information (step 204). For each of the semiconductor packages in the volume forecast, test strategy program 110 receives product information. Product information includes, but is not limited to, module name, part number, customer, form factor, interconnect metallurgy and wire metallurgy. In one embodiment, test strategy program 110 receives the product information from a user of client computing device 104 via user interface 106. In another embodiment, test strategy program 110 may retrieve the product information from database 114.

Test strategy program 110 retrieves test requirements (step 206). Responsive to receiving product information, test strategy program 110 retrieves applicable test requirements for the products in the forecast. Test strategy program 110 retrieves the test requirements from database 114. Test requirements may be specified by an industry standard, for example, JEDEC. Test requirements may also be specified by an internal, enterprise specification. In addition, a customer that requires special testing may specify test requirements. Typical tests performed on semiconductor packages include DTC, HTS, HAST, and PCT.

Test strategy program 110 retrieves vendor capability (step 208). Test strategy program 110 retrieves test capability of each qualified test vendor from database 114. Vendor capability may include both testing capability, i.e., a list of environmental test chambers and equipment, as well as testing capacity, i.e. the quantity of modules that a vendor can test over a period of time.

Test strategy program 110 determines the test strategy (step 210). Using data analytics, as would be apparent to those of ordinary skill in the art, test strategy program 110 reviews the inputs of volume forecast, product information, test requirements, and vendor capability to determine the test strategy for an ongoing reliability monitor. Test strategy program 110 chooses appropriate products to ensure that all product types, form factors, and metallurgies are monitored. Test strategy program 110 determines a combination of semiconductor packages and tests to ensure that all products are either monitored directly or that product attributes of products that are not being tested are included in the monitor. For example, as will be recognized by one skilled in the art, assuming all other product attributes are the same, a larger module fails before a smaller module because there is inherently less stress on the semiconductor interconnects of a module with a form factor of, for example, 15 millimeters by 15 millimeters (15 mm×15 mm) than a module with a form factor of 35 millimeters by 35 millimeters (35 mm×35 mm). Therefore if test strategy program 110 chooses to test a 35 mm×35 mm module, the attributes of a 15 mm×15 mm module are tested by default. Often a test strategy of this type is known as an "umbrella strategy". Test strategy program 110 also ensures that the assigned test vendors can adequately manage the quantity and types of samples to be tested.

Test strategy program 110 determines whether any exemptions or exceptions exist (decision block 212). Test strategy program 110 determines whether any exemptions or exceptions exist for any products included in the determined test strategy. For example, a customer may specify additional testing if, for example, a particular part number is experiencing a high number of failures. In another example, a customer may specify that certain part numbers do not require previously specified testing because the particular modules are performing well above the expected failure rate for a prolonged period of time. In one embodiment, test strategy program 110 reviews information in database 114 to determine whether any exemptions or exceptions exist. In another embodiment, test strategy program 110 may query the user of client computing device 104, via user interface 106, for exemptions or exceptions. For example, test strategy program 110 may display a popup box to the user that requests the user input any known exemptions or exceptions.

If test strategy program 110 determines that exemptions or exceptions exist ("yes" branch, decision block 212), then test strategy program 110 adds the exemptions and/or exceptions to the previously determined test strategy (step 214). Test strategy program 110 reconfigures the test strategy to include the exemptions and/or exceptions.

Responsive to adding the exemptions and/or exceptions to the test strategy, or if test strategy program 110 determines there are no exemptions or exceptions ("no" branch, decision block 212), then test strategy program 110 generates output (step 216). In one embodiment, test strategy program 110 generates a table that organizes the test strategy into rows and columns. For example, each row may include a customer name, part number, module name, module form factor, module metallurgy, test vendor, specified tests, and a test schedule. In one embodiment, a user of client computing device 104 requests the output via user interface 106. In another embodiment, test strategy program 110 automatically sends the output to a pre-defined distribution list as a notification of the upcoming testing.

Test strategy program 110 determines whether the test strategy is approved (decision block 218). In order to proceed with the test strategy, test strategy program 110 requires approval. In one embodiment, test strategy program 110 requests approval from a user of client computing device 104, via user interface 106. For example, test strategy program 110 may display a popup box to the user that requests approval. In another embodiment, test strategy program 110 may compare the current test strategy to previous test strategies stored in database 114 and determine whether the module attribute coverage matches previous test strategies to within a pre-defined threshold. In a further embodiment, test strategy program 110 may proceed without requiring approval.

If test strategy program 110 determines the test strategy is not approved ("no" branch, decision block 218), then test strategy program 110 receives changes (step 220). In an embodiment where test strategy program 110 requests approval from a user of client computing device 104, via user interface 106, the user may input changes to the test strategy. For example, a user may add a particular module to the list of modules for testing because the user is aware of recent high test fallout in manufacturing of the particular module. Responsive to receiving changes to the test strategy, test strategy program 110 returns to step 216 to generate output that reflects the changes.

If test strategy program 110 determines the strategy is approved ("yes" branch, decision block 218), then test strategy program 110 sends instructions (step 222). In one embodiment, test strategy program 110 sends the details of the required testing to the test vendors for execution of the test strategy. For example, test strategy program 110 may send an email notification to a test vendor with a portion of the previously generated output that pertains to the test vendor in order to specify the module quantities and test requirements for the vendor. Test requirements may include the type of test, test conditions, and due date. In one embodiment, the notification includes a request for a quote. In another embodiment, test strategy program 110 sends the test strategy to an appropriate supply chain user for communication to one or more test vendors.

Figure 3:
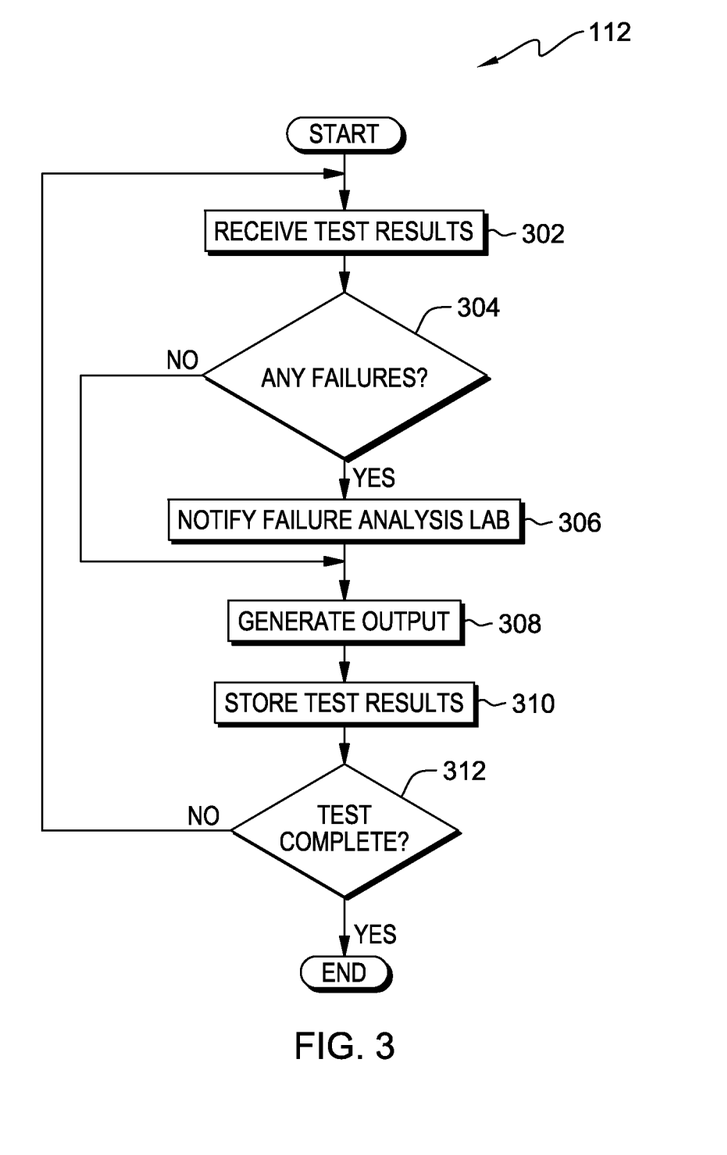
FIG. 3 is a flowchart depicting operational steps of a test results program, on the server computer within the distributed data processing environment of FIG. 1, for tracking test status, in accordance with an embodiment of the present invention.

FIG. 3 is a flowchart depicting operational steps of test results program 112, on server computer 108 within distributed data processing 100 environment of FIG. 1, for tracking test status, in accordance with an embodiment of the present invention.

Test results program 112 receives test results (step 302). After a reliability test vendor completes a test milestone, test results program 112 receives the test results. In one embodiment, test results program 112 receives the test results directly from the vendor. For example, if the vendor is a user of client computing device 104, then the vendor can input test results using user interface 106. In another embodiment, a user inputs test results to database 114 which triggers database 114 to send the test results to test results program 112. In a further embodiment, test results program 112 compares the received results to the test strategy determined by test strategy program 110 to determine whether the tests included in the test strategy are the same as tests that produced the results.

Test results program 112 determines whether there are any failures (decision block 304). Test results program 112 compares the test results to test criteria stored in database 114 to determine whether any of the test data indicates a failure to meet the test criteria. Test criteria can be, for example, a change in resistance measured at an interconnect between the semiconductor device and the substrate. If the resistance change is greater than the specified criteria, then the measured interconnect is a test failure.

If test results program 112 determines that there is a test failure ("yes" branch, decision block 304), then test results program 112 notifies a failure analysis laboratory (step 306). Test results program 112 notifies a failure analysis laboratory of a test failure so that the laboratory can prepare to analyze the failed interconnect. Advanced notification allows the failure analysis laboratory to schedule staffing and equipment prior to the arrival of the sample at the laboratory. In another embodiment, if test results program 112 determines that there is a test failure, then test results program 112 may notify a user to select an additional sample to test in order to confirm the detected failure. In a further embodiment, if test results program 112 determines that there is a test failure, then test results program 112 may send a notification of the failure to a pre-defined distribution list.

Responsive to notifying the failure analysis laboratory of a failure, or if test results program 112 determines that there are no test failures ("no" branch, decision block 304), then test results program 112 generates output (step 308). In one embodiment, test results program 112 generates additional columns in a previously generated table to reflect the status and results of a test, and a user of client computing device 104 with authenticated access credentials can access the updated table, via user interface 106. In an embodiment, test results program 112 updates the table initially created by test strategy program 110. In another embodiment, test results program 112 generates a notification of test results that test results program 112 sends to a pre-defined distribution list.

Test results program 112 stores test results (step 310). Test results program 112 stores the received test results in database 114 for documentation and later retrieval. For example, if a user of client computing device 104 wants to review test history of a particular module part number over time, the user can retrieve the stored test results from database 114.

Test results program 112 determines whether a test is complete (decision block 312). Test results program 112 determines whether the test results received in step 302 are the final results for a particular test. Typically, each stress test is specified to proceed to a number of hours or cycles, or to a pre-defined number of failures. Test results program 112 reviews the status of the test and determines whether the test is complete or if the received test results are interim results. In one embodiment, test results program 112 determines all testing is complete by comparing the test results to the test strategy determined by test strategy program 110 and determining that all of the tests indicated by the test strategy are complete. If test results program 112 determines the test is not complete ("no" branch, decision block 312), then test results program 112 returns to step 302 to receive additional test results. In an embodiment, the time interval between when test results program 112 determines the test is not complete and when test results program 112 receives additional test results may extend for days, weeks, or months. If test results program 112 determines the test is complete ("yes" branch, decision block 312), then test results program 112 ends.

Figure 4:
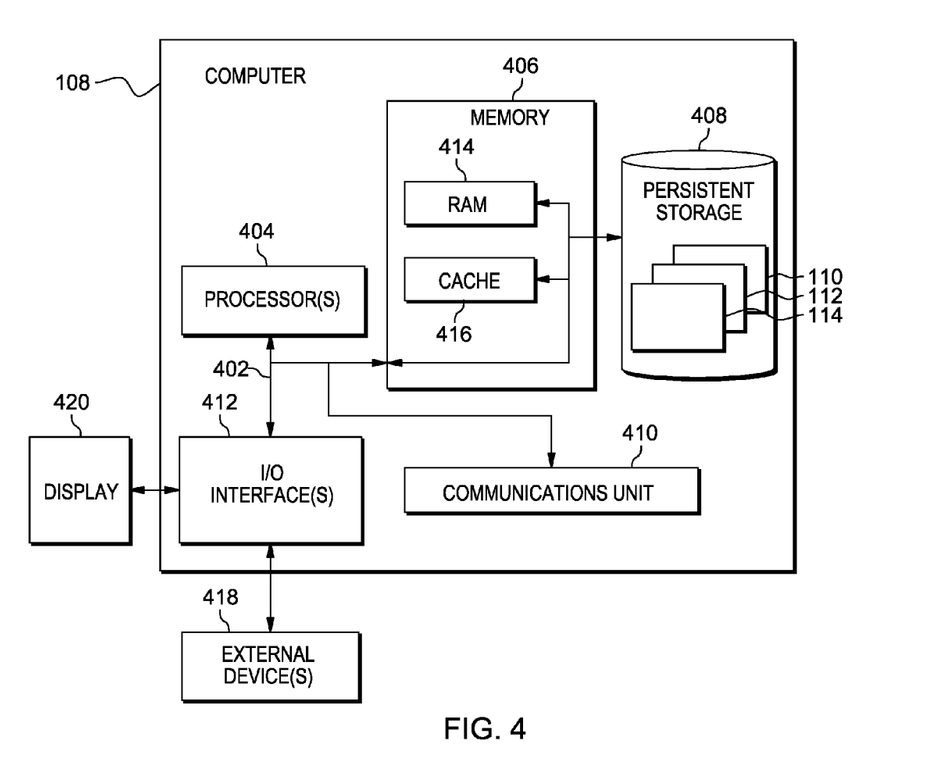
FIG. 4 depicts a block diagram of components of the server computer executing the test strategy program and the test results program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Test strategy program 110, test results program 112, and database 114 are stored in persistent storage 408 for execution and/or access by one or more of the respective computer processor(s) 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Test strategy program 110, test results program 112, and database 114 may be downloaded to persistent storage 408 through communications unit 410.

I/O interface(s) 412 allows for input and output of data with other devices that may be connected to server computer 108. For example, I/O interface(s) 412 may provide a connection to external device(s) 418 such as a keyboard, a keypad, a touch screen, a microphone, a digital camera, and/or some other suitable input device. External device(s) 418 can also include portable computer readable storage media such as, for example, thumb drives, portable optical or magnetic disks, and memory cards. Software and data used to practice embodiments of the present invention, e.g., test strategy program 110, test results program 112 and database 114, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining reliability test strategy, the method comprising:

receiving, by one or more computer processors, a volume forecast for manufacturing one or more products;

receiving, by the one or more computer processors, information describing the one or more products;

retrieving, by the one or more computer processors, reliability test requirements associated with the one or more products;

retrieving, by the one or more computer processors, reliability test capability of one or more reliability test vendors; and determining, by the one or more computer processors, based, at least in part, on the volume forecast, the information describing the one or more products, the reliability test requirements, and the reliability test capability of the one or more reliability test vendors, a reliability test strategy.

2. The method of claim 1, further comprising:
determining, by the one or more computer processors, whether one or more exceptions to the reliability test requirements exists; and
responsive to determining one or more exceptions to the reliability test requirements exists, adding, by the one or more computer processors, the one or more exceptions to the reliability test strategy.

3. The method of claim 1, further comprising, responsive to determining the reliability test strategy, generating, by the one or more computer processors, output, wherein output includes at least a table listing one or more of a module name, a part number, a form factor, a customer, a reliability test vendor, one or more specified tests, and a test schedule.

4. The method of claim 1, further comprising:
determining, by the one or more computer processors, whether the reliability test strategy is approved; and
responsive to determining the reliability test strategy is not approved, receiving, by the one or more computer processors, one or more changes to the reliability test strategy.

5. The method of claim 1, further comprising sending, by the one or more computer processors, at least one instruction corresponding to the reliability test strategy to the one or more reliability test vendors.

6. The method of claim 1, wherein information describing the one or more products includes at least: a module name, a part number, a form factor, a customer, an interconnect metallurgy, and a wire metallurgy.

7. The method of claim 1, wherein reliability test capability of the one or more reliability test vendors includes at least test equipment capability and test equipment capacity.

8. The method of claim 1, further comprising:
receiving, by the one or more computer processors, reliability test results, based, at least in part, on the reliability test strategy;
determining, by the one or more computer processors, whether the reliability test results include one or more failures; and
responsive to determining the reliability test results include one or more failures, notifying, by the one or more computer processors, a failure analysis laboratory.

9. A computer program product for determining reliability test strategy, the computer program product comprising:
one or more computer readable storage media and program instructions stored on the one or more computer readable storage media, the program instructions comprising:
program instructions to receive a volume forecast for manufacturing one or more products;
program instructions to receive information describing the one or more products;
program instructions to retrieve reliability test requirements associated with the one or more products;
program instructions to retrieve reliability test capability of one or more reliability test vendors; and
program instructions to determine, based, at least in part, on the volume forecast, the information describing the one or more products, the reliability test requirements, and the reliability test capability of the one or more reliability test vendors, a reliability test strategy.

10. The computer program product of claim 9, further comprising:
program instructions to determine whether one or more exceptions to the reliability test requirements exists; and
responsive to determining one or more exceptions to the reliability test requirements exists, program instructions to add the one or more exceptions to the reliability test strategy.

11. The computer program product of claim 9, further comprising, responsive to determining the reliability test strategy, program instructions to generate output, wherein output includes at least a table listing one or more of a module name, a part number, a form factor, a customer, a reliability test vendor, one or more specified tests, and a test schedule.

12. The computer program product of claim 9, further comprising:
program instructions to determine whether the reliability test strategy is approved; and
responsive to determining the reliability test strategy is not approved, program instructions to receive one or more changes to the reliability test strategy.

13. The computer program product of claim 9, further comprising program instructions to send at least one instruction corresponding to the reliability test strategy to the one or more reliability test vendors.

14. The computer program product of claim 9, further comprising:
program instructions to receive reliability test results, based, at least in part, on the reliability test strategy;
program instructions to determine whether the reliability test results include one or more failures; and
responsive to determining the reliability test results include one or more failures, program instructions to notify a failure analysis laboratory.

15. A computer system for determining reliability test strategy, the computer system comprising:
one or more computer processors;
one or more computer readable storage media;
program instructions stored on the one or more computer readable storage media for execution by at least one of the one or more computer processors, the program instructions comprising:
program instructions to receive a volume forecast for manufacturing one or more products;
program instructions to receive information describing the one or more products;
program instructions to retrieve reliability test requirements associated with the one or more products;
program instructions to retrieve reliability test capability of one or more reliability test vendors; and
program instructions to determine, based, at least in part, on the volume forecast, the information describing the one or more products, the reliability test requirements, and the reliability test capability of the one or more reliability test vendors, a reliability test strategy.

16. The computer system of claim 15, further comprising:
program instructions to determine whether one or more exceptions to the reliability test requirements exists; and
responsive to determining one or more exceptions to the reliability test requirements exists, program instructions to add the one or more exceptions to the reliability test strategy.

17. The computer system of claim 15, further comprising, responsive to determining the reliability test strategy, program instructions to generate output, wherein output includes at least a table listing one or more of a module name, a part number, a form factor, a customer, a reliability test vendor, and one or more specified tests, a test schedule.

18. The computer system of claim 15, further comprising:
program instructions to determine whether the reliability test strategy is approved; and
responsive to determining the reliability test strategy is not approved, program instructions to receive one or more changes to the reliability test strategy.

19. The computer system of claim 15, further comprising program instructions to send at least one instruction corresponding to the reliability test strategy to the one or more reliability test vendors.

20. The computer system of claim 15, further comprising:
program instructions to receive reliability test results, based, at least in part, on the reliability test strategy;
program instructions to determine whether the reliability test results include one or more failures; and
responsive to determining the reliability test results include one or more failures, program instructions to notify a failure analysis laboratory.

\* \* \* \* \*